(12) United States Patent
Goad et al.

(10) Patent No.: US 11,396,125 B2
(45) Date of Patent: Jul. 26, 2022

(54) LINERS AND METHODS OF MAKING LINERS

(71) Applicant: Goad Company, Independence, MO (US)

(72) Inventors: Curtis Goad, Parkville, MO (US); Tyler Goad, Independence, MO (US); Phillip Pyatt, Independence, MO (US)

(73) Assignee: Goad Company, Independence, MO (US)

( * ) Notice: Subject to any disclaimer, the term of this patent is extended or adjusted under 35 U.S.C. 154(b) by 136 days.

(21) Appl. No.: 16/853,150

(22) Filed: Apr. 20, 2020

(65) Prior Publication Data

US 2020/0331192 A1    Oct. 22, 2020

Related U.S. Application Data

(60) Provisional application No. 62/836,477, filed on Apr. 19, 2019.

(51) Int. Cl.
| | | |
|---|---|---|
| *B29C 63/04* | (2006.01) | |
| *B29C 63/00* | (2006.01) | |
| *B29C 65/04* | (2006.01) | |
| *B29C 65/74* | (2006.01) | |
| *B29C 53/06* | (2006.01) | |

(Continued)

(52) U.S. Cl.
CPC ............ *B29C 63/04* (2013.01); *B29C 53/066* (2013.01); *B29C 63/0004* (2013.01); *B29C 65/04* (2013.01); *B29C 65/74* (2013.01); *B29C 66/02241* (2013.01); *B29C 66/4326* (2013.01); *B31B 50/14* (2017.08); *B31B 50/20* (2017.08); *B31B 50/26* (2017.08); *B29C 2063/021* (2013.01); *B29C 2791/001* (2013.01);

(Continued)

(58) Field of Classification Search
CPC ....... B29C 53/066; B29C 65/04; B29C 65/74; B29C 66/02241; B29C 66/4326; B29C 63/0004; B29C 63/04; B65D 85/84; B65D 90/08
See application file for complete search history.

(56) References Cited

U.S. PATENT DOCUMENTS 2,384,067 A    9/1945   Ballintine
2,818,484 A *  12/1957  Sevison .............. B29C 66/8746
                                                  219/769

(Continued)

FOREIGN PATENT DOCUMENTS

DE    102012101444 A1 *  8/2013  ........... B29C 53/066
KR    W02015016551        2/2015

OTHER PUBLICATIONS https://www.britannica.com/science/Vinylite (Year: 2021).*

(Continued)

*Primary Examiner* — Barbara J Musser
(74) *Attorney, Agent, or Firm* — Harness, Dickey & Pierce, P.L.C.; Anthony G. Fussner

(57) ABSTRACT

The present disclosure relates to liners and methods of making liners. The liners may be suitable for use with tanks and other storage/containment vessels, such as process tanks, immersion tanks, indoor or outdoor containment pits, gravity feed conduits (e.g., concrete trench, canal, or drain, etc.) for transferring or conveying liquid, grain storage tanks or containers (e.g., dielectric or electrically non-conductive liners for grain storage, etc.), etc.

21 Claims, 14 Drawing Sheets

(51) Int. Cl.
    *B29C 65/00* (2006.01)
    *B29C 63/02* (2006.01)
    *B31B 50/20* (2017.01)
    *B31B 50/14* (2017.01)
    *B31B 50/26* (2017.01)
    *B65D 90/08* (2006.01)

(52) U.S. Cl.
    CPC .............. *B29C 2791/002* (2013.01); *B29C 2793/0081* (2013.01); *B65D 90/08* (2013.01)

(56) References Cited

U.S. PATENT DOCUMENTS

| | | |
|---|---|---|
| 3,279,971 A | 10/1966 | Gardener |
| 3,485,409 A | 12/1969 | Becker |
| 3,658,627 A | 4/1972 | Kaminsky |
| 3,853,669 A | 12/1974 | Werstlein |
| 3,927,233 A | 12/1975 | Naidoff |
| 3,951,308 A | 4/1976 | Thirtle |
| 4,102,726 A | 7/1978 | Brackman |
| 4,457,457 A | 7/1984 | Dziki |
| 4,796,676 A | 1/1989 | Hendershot et al. |
| 4,942,978 A | 7/1990 | Bessette |
| 5,074,833 A | 12/1991 | Futerman |
| 5,322,539 A | 6/1994 | Mathisen et al. |
| 5,345,666 A | 9/1994 | Matyja |
| 5,368,073 A | 11/1994 | Murphy |
| 5,505,814 A | 4/1996 | Glaser et al. |
| 5,804,112 A | 9/1998 | Greene |
| 5,814,175 A | 9/1998 | Rau et al. |
| 5,820,718 A | 10/1998 | Dean |
| 5,836,363 A | 11/1998 | LaFleur |
| 5,867,883 A | 2/1999 | Iorio et al. |
| 5,979,686 A | 11/1999 | Dean |
| 6,161,714 A * | 12/2000 | Matsuura ............. B62D 29/045 220/1.5 |
| 6,293,694 B1 | 9/2001 | Mesing |
| 6,394,534 B1 | 5/2002 | Dean |
| 6,431,387 B2 | 8/2002 | Piehler |
| 6,579,439 B1 | 6/2003 | Chandler |
| 7,111,497 B2 | 9/2006 | Goad et al. |
| 8,133,345 B2 | 3/2012 | Goad |
| 8,925,754 B2 | 1/2015 | Goad et al. |
| 8,955,711 B2 | 2/2015 | Goad |
| 9,278,478 B2 | 3/2016 | Goad |
| 9,759,380 B2 | 9/2017 | Goad |
| 10,138,053 B2 | 11/2018 | Goad |
| 10,392,186 B2 | 8/2019 | Goad |
| 2001/0004992 A1 | 6/2001 | Kawasaki et al. |
| 2001/0011672 A1 | 8/2001 | Aota et al. |
| 2001/0023566 A1 | 9/2001 | Ezumi et al. |
| 2002/0119336 A1 | 8/2002 | Kawasaki et al. |
| 2003/0056459 A1 | 3/2003 | Ezumi et al. |
| 2004/0060857 A1 | 4/2004 | Pattee |
| 2004/0067381 A1 | 4/2004 | Grund et al. |
| 2004/0200842 A1 | 10/2004 | Low et al. |
| 2005/0011159 A1 | 1/2005 | Standal et al. |
| 2005/0052047 A1 | 3/2005 | McMahon et al. |
| 2005/0129796 A1 | 6/2005 | Bortoli |
| 2006/0051442 A1 | 3/2006 | Miceli et al. |
| 2006/0054661 A1 | 3/2006 | Di Miceli et al. |
| 2006/0057241 A1 | 3/2006 | Di Miceli et al. |
| 2006/0118246 A1 | 6/2006 | Williams |
| 2008/0245471 A1 | 10/2008 | Goad |
| 2009/0274857 A1 | 11/2009 | Garver et al. |
| 2010/0025337 A1 | 2/2010 | Yencho |
| 2012/0121359 A1 | 5/2012 | Bray et al. |
| 2012/0148805 A1 | 6/2012 | Goad |
| 2013/0248524 A1 | 9/2013 | Goad |
| 2017/0182686 A1* | 6/2017 | Mankowski .......... B29C 66/843 |
| 2017/0369236 A1 | 12/2017 | Goad |
| 2017/0369238 A1 | 12/2017 | Goad |
| 2020/0013254 A1 | 1/2020 | Bytnar et al. |

OTHER PUBLICATIONS

Extrusion Welding of Thermoplastics, the Professional Division of the Welding Institute, Mar. 2002, http://www.twi.co.uk/professional/protected/band.sub.--3/jk57.html.

Plastic Welding, The Plastics Distributor & Fabricator, Mar./Apr. 2003, http://www.plasticsmag.com/features.asp?flssue=Mar/Apr-03.

Tanks and Liners: Is Conventional Wisdom or Reliance on Internet-Based Answers Putting you Company at Risk?; Curtis Goad; Dec. 3, 2010; http;//www.pfonline.com/articles.

High Strength XR-5 Geomemgranes/Durable duPont Dacron Polyester; https://www.globalplasticsheeting.com/xr-5-geomembranes; Copyright 2008-2017; 5 pages.

XR Geomembranes by Seaman Corporation; http://www.xrgeomembranes.com/ accessed Sep. 1, 2017; 4 pages.

http://www.sunbeltstudwelding.com/weldstuds/arc.sub.--headconachor.htm; ; Feb. 29, 2012; 1 pg.

http://www.atlasmin.com/products/corrosion.sub.--resistant/pdf/4-5000ps--7- -05.pdf; Atlas Data Sheet; 2005; 4 pgs.

Geomembrane; https://enwikipedia.org/Geomembrane: Mar. 1, 20176; 6 pages.

* cited by examiner

LINERS AND METHODS OF MAKING LINERS

CROSS-REFERENCE TO RELATED APPLICATION

This application claims the benefit of and priority to U.S. Provisional Application No. 62/836,477 filed Apr. 19, 2019 which is incorporated herein by reference in its entirety.

FIELD

The present disclosure relates to liners and methods of making liners.

BACKGROUND

This section provides background information related to the present disclosure which is not necessarily prior art.

Process tanks are commonly used to store contents such as acids, coating or plating materials (e.g., chromium, black oxide, etc.) and other chemicals. These tanks relate to immobile types that may be installed above or below the ground, but also for the transportable types that are part of the over-the-road semi-trailers. The tanks may also be used on or in marine vessels as well as railroad cars. The size of the tank is not material, but the larger process tanks typically hold 1,000 gallons or more. Moreover, process tanks are particularly adaptable for tanks intended for highly corrosive liquids, but also may be used in conjunction with other pourable materials such as grain and pellets.

Many process tanks are steel, which, over a period of time, may become corroded as a result of the corrosive fluids stored therein or because of the rusting action of the exterior elements (e.g., ground water, rain, etc.). If the material stored in such tanks is corrosive, the corrosive material can contact the tank. In this situation, the life expectancy of the tank is relatively short and thus it becomes not only extremely expensive for replacement, but also highly dangerous for people and the environment. Furthermore, there is danger in the event that the tanks leak or are ruptured, or somehow fail to retain the contents and leak the contents into the ground (if the tanks are subterranean). Above-the-ground storage tanks or over-the-road type tanks may also present a danger along highways and to the passing public. Accordingly, many process tanks utilize a protective liner or protective lining.

DRAWINGS

The drawings described herein are for illustrative purposes only of selected embodiments and not all possible implementations, and are not intended to limit the scope of the present disclosure.

Figure 7:
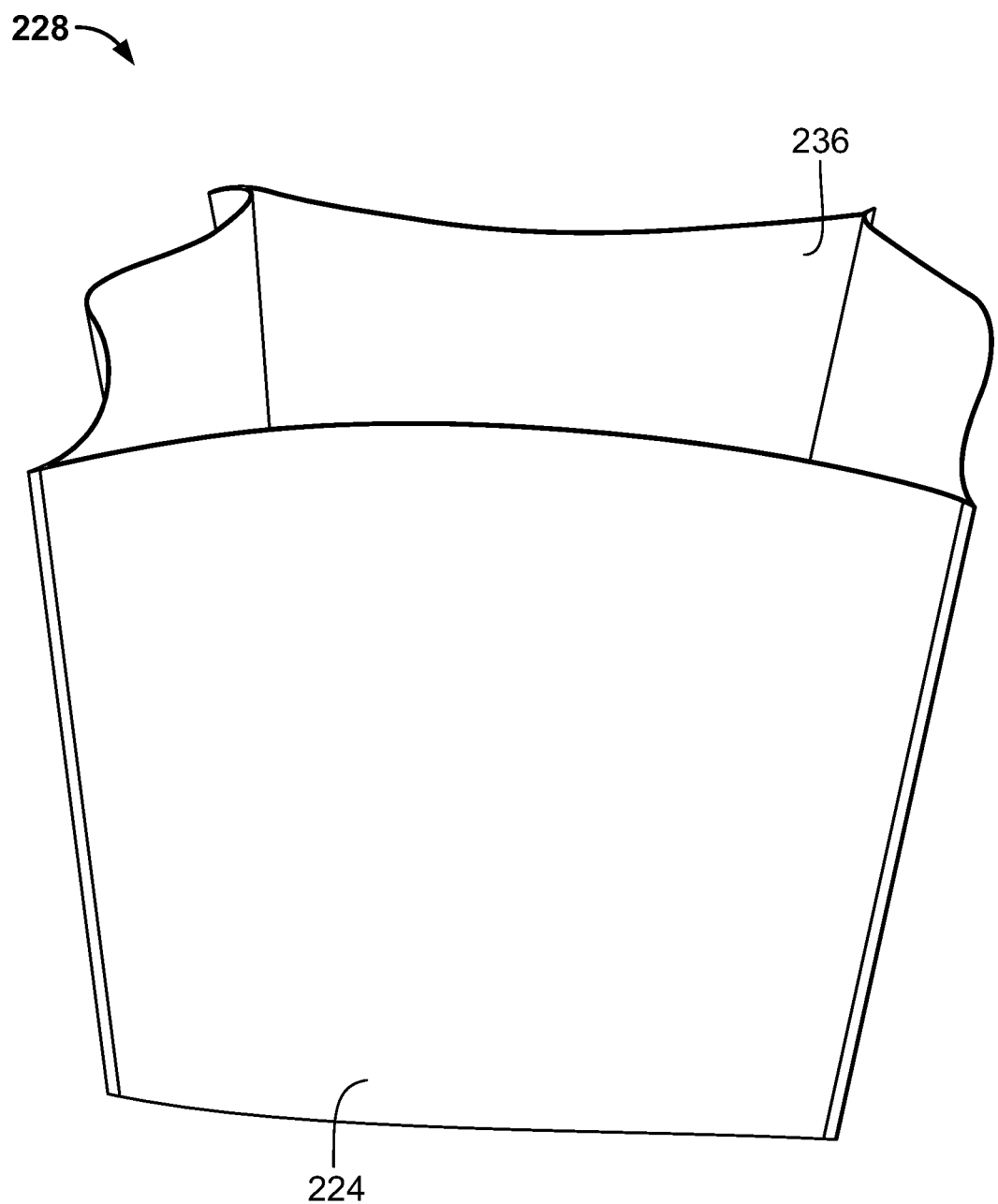

FIG. 7 show a liner according to another exemplary embodiment in which the liner is made from two sheets or panels of polyvinylidene fluoride (PVDF) that are attached to each other by RF overlap welds along overlapped edges of the PVDF sheets. Then, the RF overlap welded PVDF sheets are cut, folded, and RF compression welded along the corners formed or defined between the pairs of adjacent sidewalls to thereby create the PVDF liner.

Figure 8:
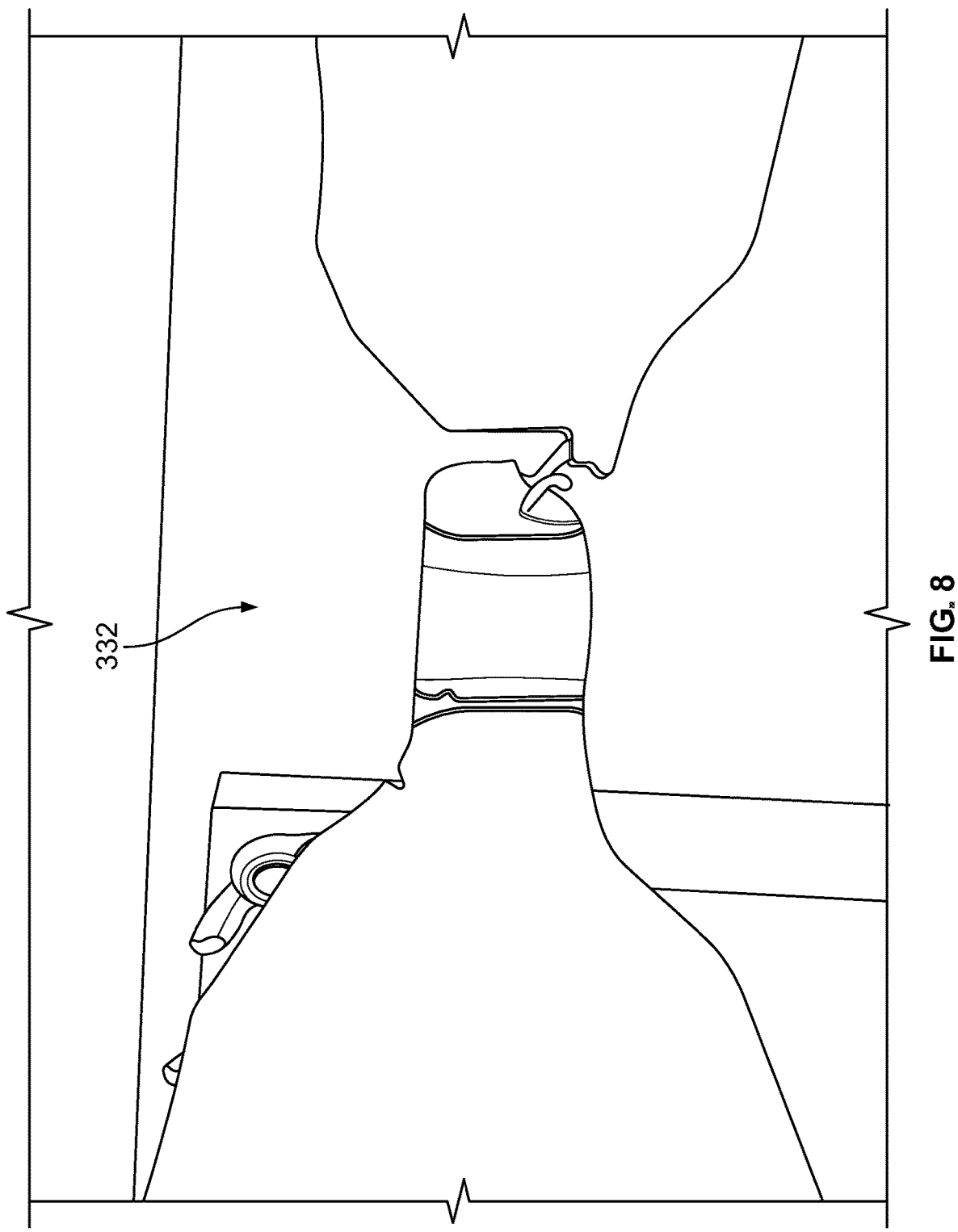

FIG. 8 generally shows good weld strength that may be achievable by an RF compression weld including an optional corner strip weld along the RF compression weld to eliminate peeling concerns associated with the RF compression weld in some exemplary embodiments.

Figure 9:
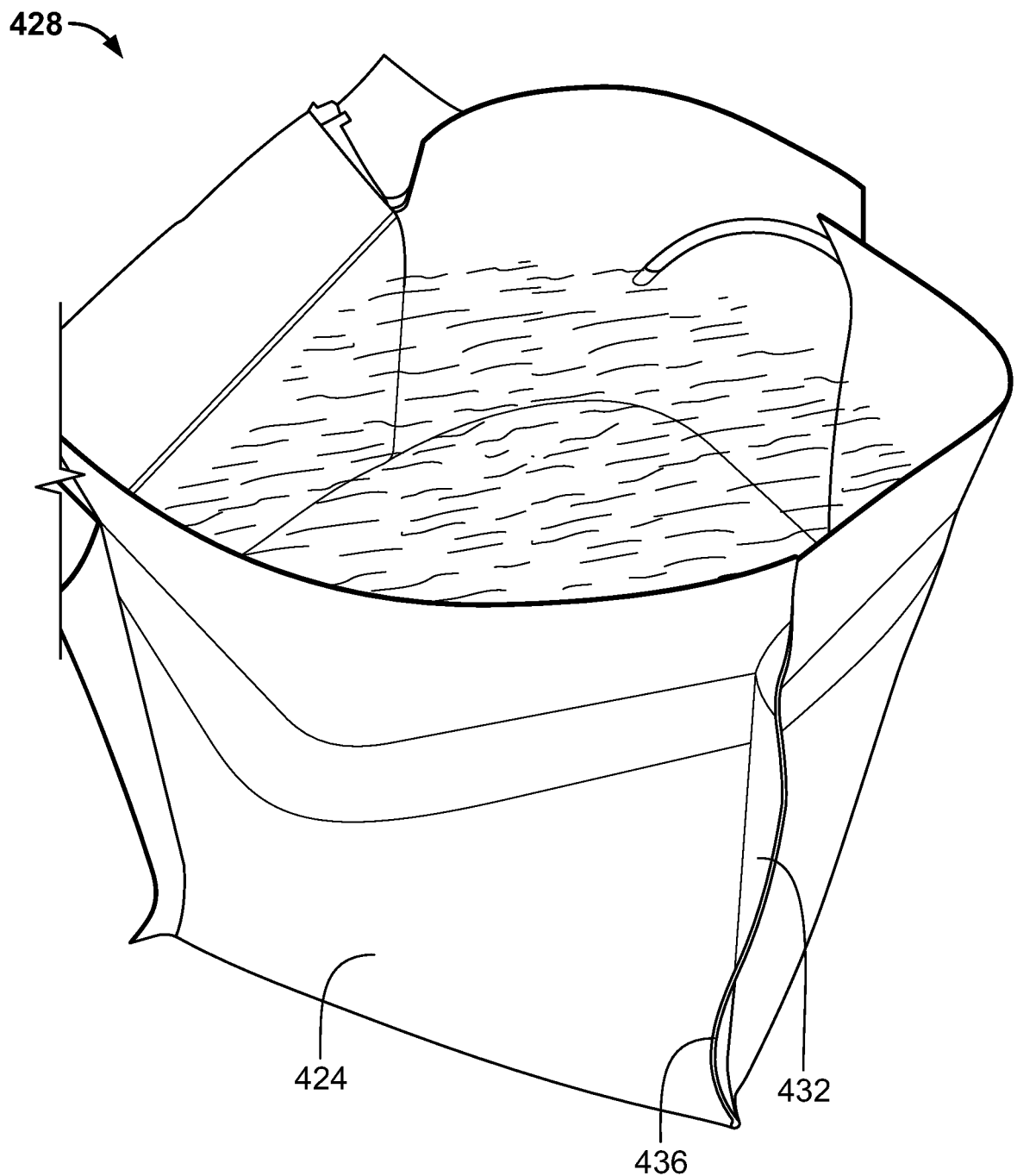

FIG. 9 shows a liner according to another exemplary embodiment in which the liner is made from two sheets or panels of polyvinylidene fluoride (PVDF) having a polyester fabric backing. The two PVDF sheets are attached to each other by RF overlap welds along overlapped edges of the PVDF sheets. Then, the RF overlap welded PVDF sheets are cut, folded, and RF compression welded along the corners formed or defined between the pairs of adjacent sidewalls to thereby create the PVDF liner. A removable clear plastic backing may be disposed over the polyester fabric backing for protection, e.g., to help keep the polyester fabric backing clean and/or free of dust, etc. An RF overlap weld(s) may extend vertically along a sidewall of the liner. By way of example only, the liner of FIG. 9 may be configured to withstand being filled with water that is at least twenty-four inches deep and/or that is at a temperature of at least 180 degrees Fahrenheit while the liner is unsupported and/or free standing.

Figure 10:
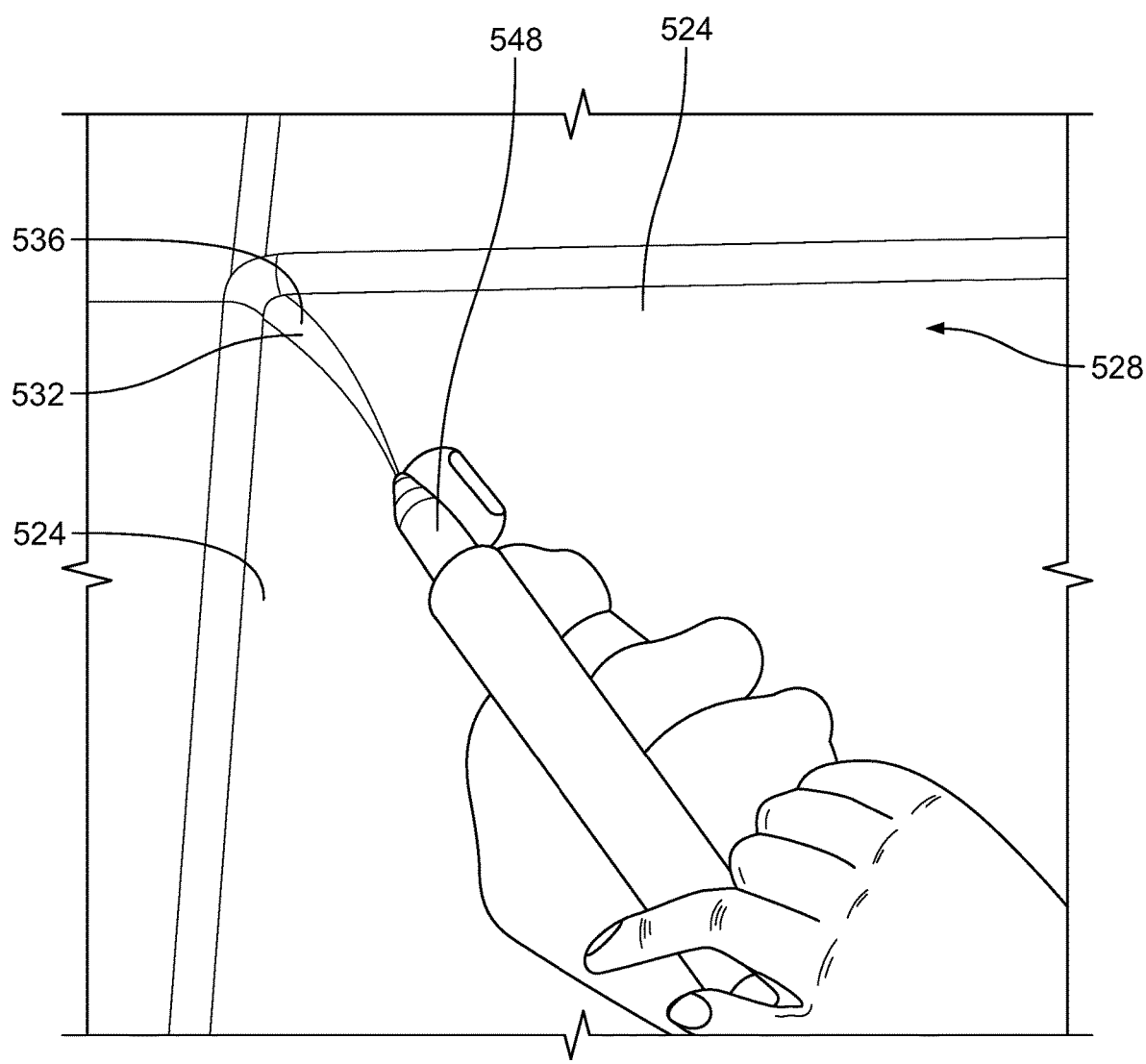

FIG. 10 shows an optional hand-welded corner strip weld being applied over and/or along a portion of an RF compression weld, which, in turn, is along a corner defined between a pair of adjacent sidewalls of a liner.

Figure 11:
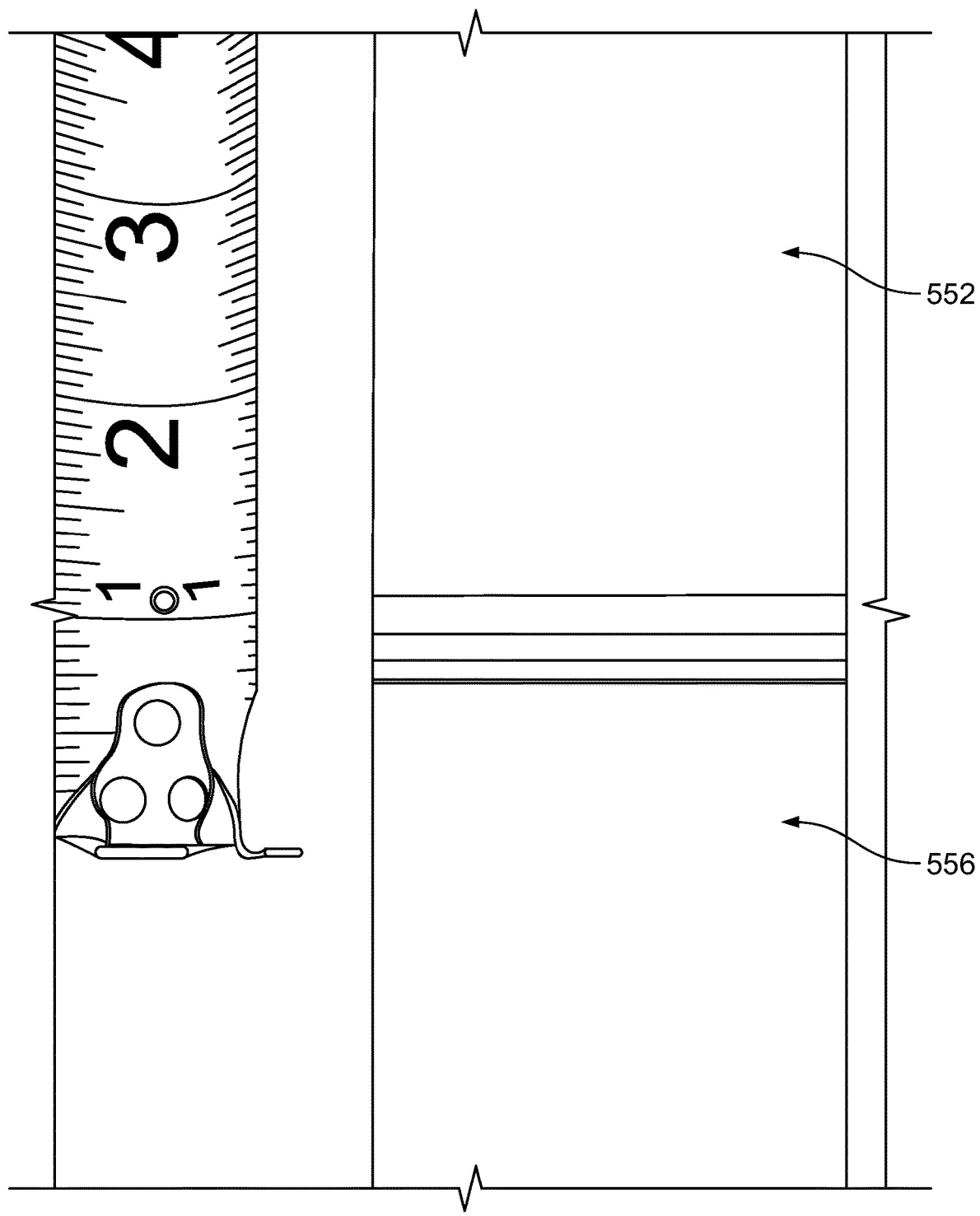
Figure 12:
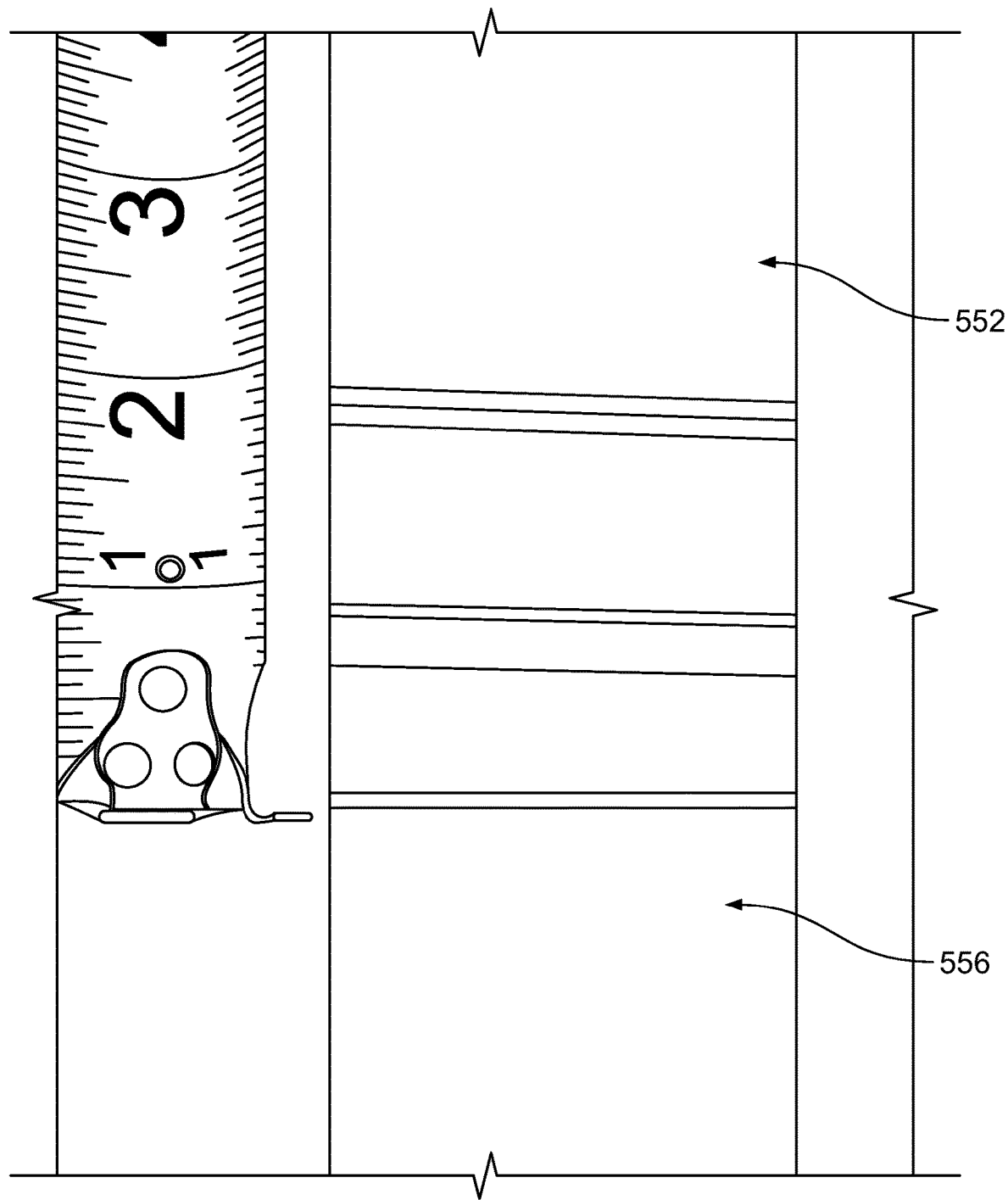
Figure 13:
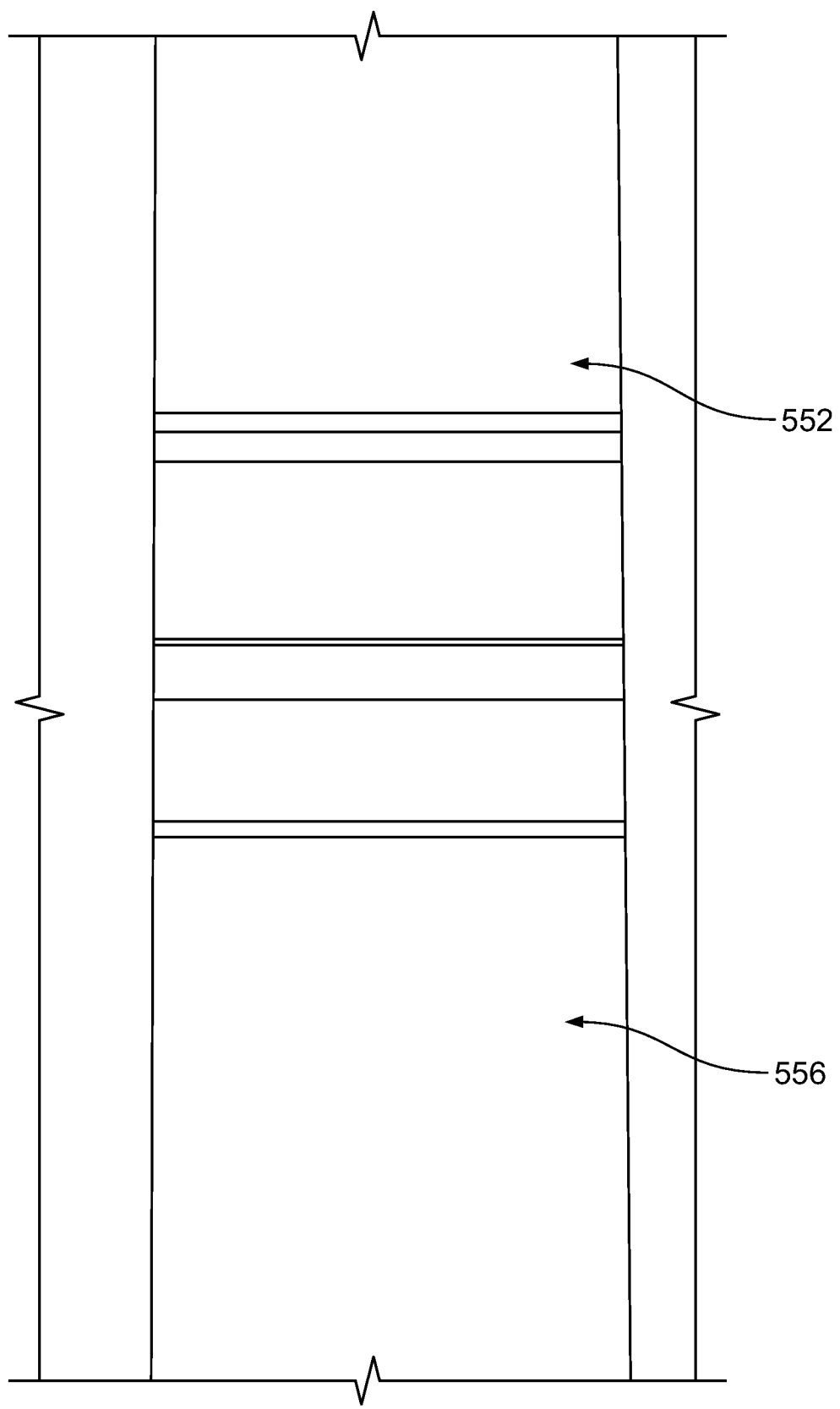

FIGS. 11, 12, and 13 show an exemplary process of attaching panels or sheets of material to each other by RF welding along overlapped edges of the sheets, which may be employed to make a larger unified panel or sheet of the material.

Figure 14:
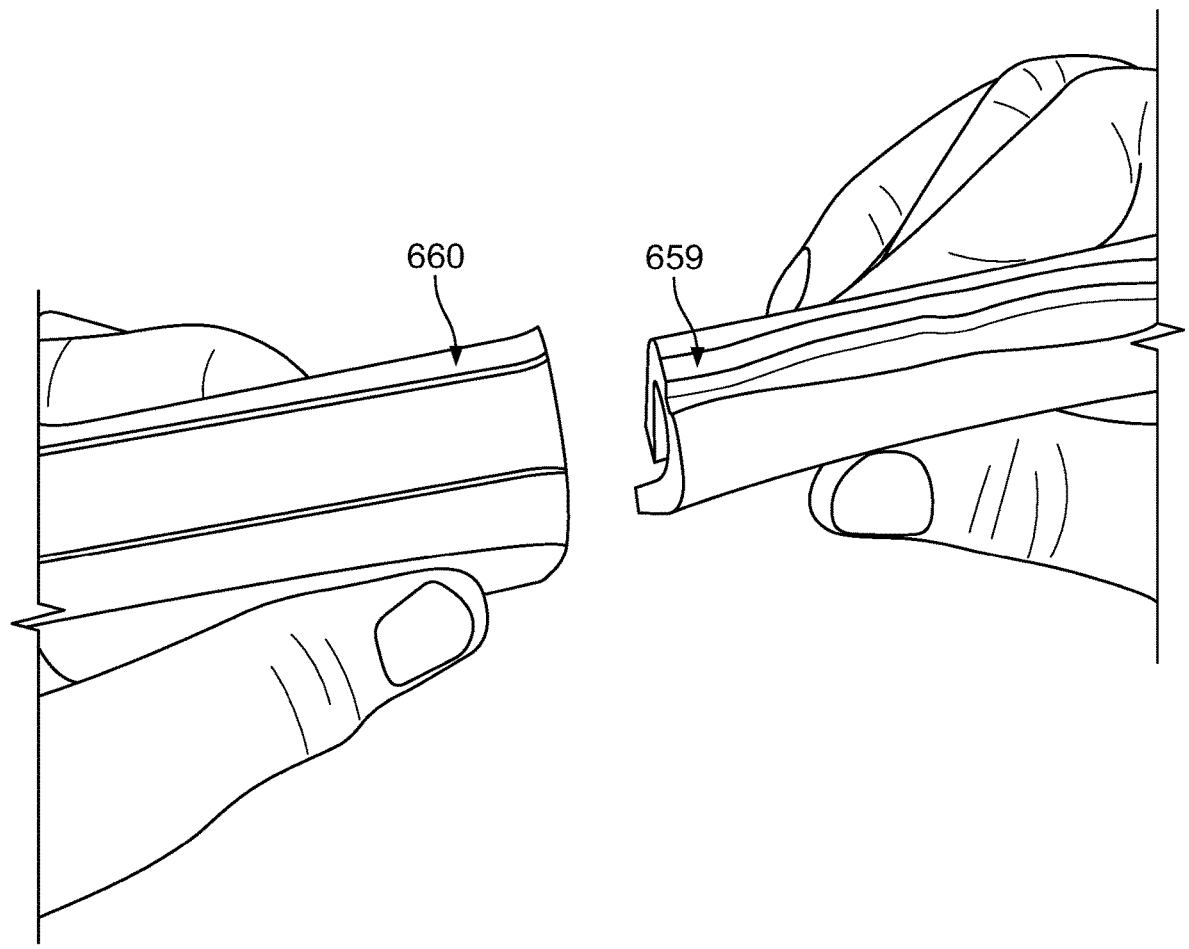

FIG. 14 shows a conventional RF overlap weld (on the right) and an exemplary embodiment of an RF overlap weld (on the left). The RF overlap weld (on the left) may be used to join overlapped edges of panels or sheets together in exemplary embodiments to make a larger unified panel or sheet. Notably, FIG. 14 shows that after undergoing similar tensile pulls, the RF overlap weld (on the left) has not failed whereas the conventional RF overlap (on the right) weld has broken apart and failed.

APPENDIX

The attached Appendix includes pull apart test results, which Appendix is incorporated herein by reference in its entirety. Page 1 of the Appendix shows a crease failure for a 90 degree bent corner in a conventional flexible liner. Page 2 of the Appendix shows a corner strip weld for addressing and/or solving peel concern associated with RF compression weld for polyvinyl chloride (PVC) (e.g., Koroseal® PVC, etc.) according to exemplary embodiments. Page 3 of the Appendix shows a panel weld that is relatively strong with a relatively huge stretch before break. Page 4 of the Appendix shows a conventional RF weld that is relatively low strength and that breaks without much stretch. Page 5 of the Appendix shows thymol applied to polyvinyl chloride (PVC) with plasticizer (e.g., Koroseal® PVC-P, etc.) for improved strength for compression weld. Page 5 of the Appendix also shows an RF compression weld along polyvinyl chloride (PVC) with plasticizer (e.g., Koroseal® PVC-P, etc.), and peel concerns.

DETAILED DESCRIPTION

Example embodiments will now be described more fully with reference to the accompanying drawings.

According to various aspects, exemplary embodiments are disclosed that include liners and methods of making liners, e.g., bag liners, drop-in liners, membrane liners, flexible heavy gauge membrane liners, etc. The liners are suitable for use with tanks and other storage/containment vessels, such as process tanks, immersion tanks, indoor or outdoor containment pits, gravity feed conduits (e.g., concrete trench, canal, or drain, etc.) for transferring or conveying liquid, grain storage tanks or containers (e.g., dielectric or electrically non-conductive liners for grain storage, etc.), etc.

In some exemplary embodiments, a liner or lining may be formed from a single sheet or panel (broadly, a piece) of material (e.g., polyvinyl chloride (PVC), polyvinylidene fluoride (PVDF), other material, etc.). The single sheet may be cut, and then rectangular cut corner pieces may be removed from the single sheet.

After the cutting and removing of the rectangular cut corner pieces, the remainder of the single sheet may include a rectangular bottom portion and four rectangular sidewall portions extending outwardly from the rectangular bottom portion. The rectangular bottom portion and four rectangular sidewall portions may cooperatively define a configuration that is generally T-shaped, cross shaped, shaped as a mathematical plus sign shape, etc.

The rectangular sidewall portions may be folded (broadly, repositioned) relative to (e.g., upwardly, perpendicularly, etc.) the rectangular bottom portion. Each pair of adjacent sidewalls may be RF compression welded to thereby create a liner. The liner includes RF compression welds along the corners formed or defined between each pair of adjacent sidewalls. The sidewalls become adjacent after being folded relative to (e.g., upwardly, perpendicularly, etc.) the rectangular bottom portion of the liner. Accordingly, the liner may have a single piece construction defined by the folded sidewalls and bottom portion of the liner.

In some other exemplary embodiments, a liner or lining may be formed from two or more sheets or panels (broadly, a piece) of material (e.g., polyvinyl chloride (PVC), polyvinylidene fluoride (PVDF), other material, etc.). In such exemplary embodiments, the sheets of material may be attached together by overlapping edges of adjacent sheets and RF overlap welding the overlapped edges together. Or, for example, the sheets may be extrusion welded together by infusing molten thermoplastic material within the interfaces of adjacent sheets as disclosed in U.S. Published Patent Application US2017/0369236 and/or U.S. Published Patent Application 2017/0369238, which are incorporated herein by reference in their entirety.

The RF overlap welded sheets may define or form a unified or joined sheet structure that may then be cut, folded, and RF compression welded to create a liner as disclosed herein for a single sheet. More specifically, the sheet structure formed from the RF overlap welded sheets may be cut and then rectangular cut corner pieces may be removed from the sheet structure. After the cutting and removing of the rectangular cut corner pieces, the remainder of the sheet structure may include a rectangular bottom portion and four rectangular sidewall portions extending outwardly from the rectangular bottom portion. The rectangular bottom portion and four rectangular sidewall portions may cooperatively define a configuration that is generally T-shaped, cross shaped, shaped as a mathematical plus sign shape, etc.

The rectangular sidewall portions may be folded relative to (e.g., upwardly, perpendicularly, etc.) the rectangular bottom portion. Each pair of adjacent sidewalls may be RF compression welded to thereby create a liner. The liner includes RF compression welds along the corners formed or defined between each pair of adjacent sidewalls. The sidewalls become adjacent after being folded relative to (e.g., upwardly, perpendicularly, etc.) the rectangular bottom portion of the liner.

Figure 1:
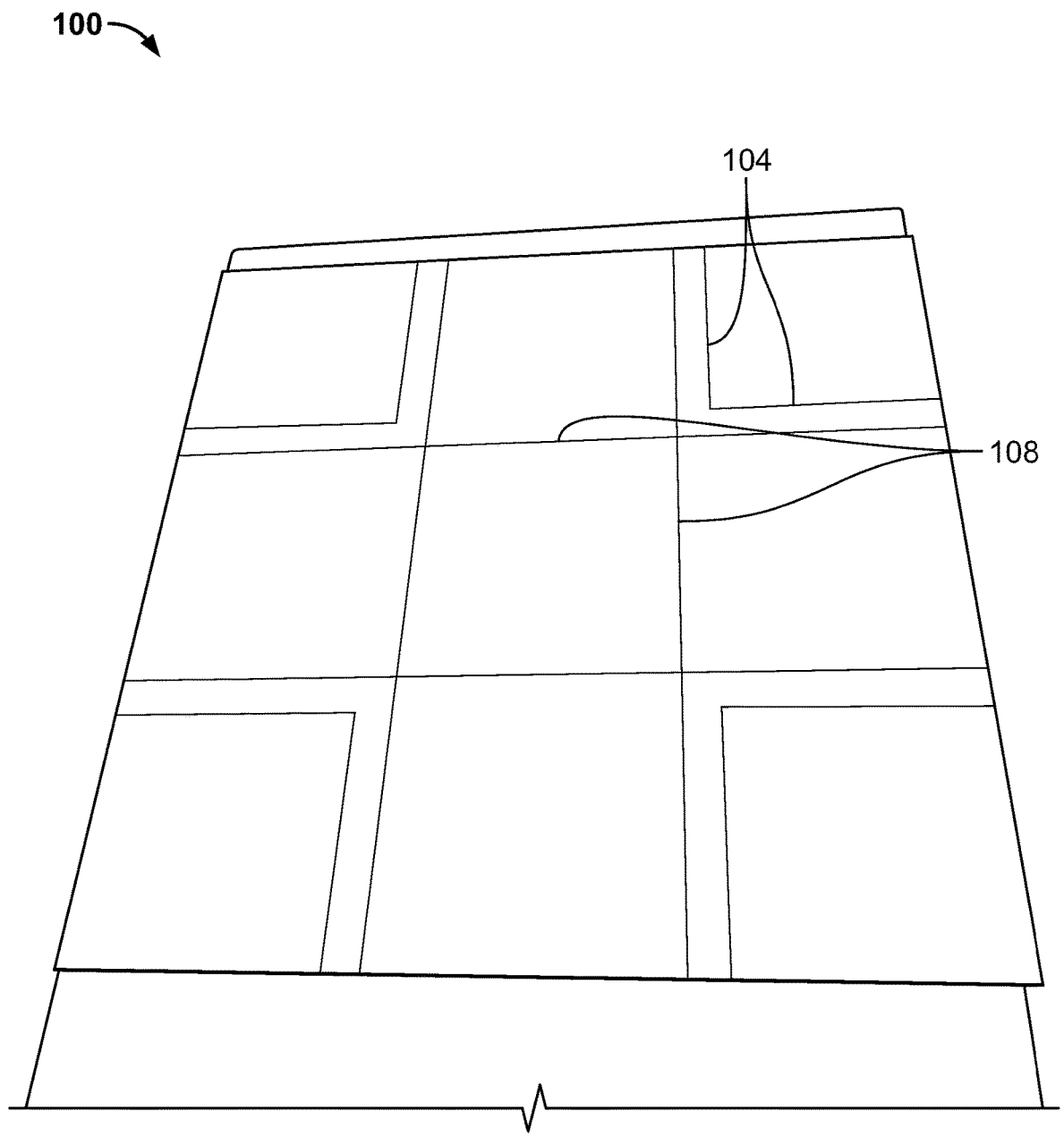
FIG. 1 shows a sheet or panel of polyvinyl chloride (PVC) including chalk lines indicating where the PVC sheet should be cut, folded, and radio frequency (RF) compression welded to create a liner according to exemplary embodiments.

With reference to the figures, FIG. 1 shows a sheet or panel 100 (broadly, a piece) of polyvinyl chloride (PVC) (e.g., Koroseal® PVC, etc.). In FIG. 1, chalk lines have been added to the PVC sheet to indicate where the PVC sheet should be cut along chalk lines 104 and then folded along chalk lines 108 so as to position pairs of the sidewalls adjacent one another for radio frequency (RF) compression welding according to exemplary embodiments.

Figure 2:
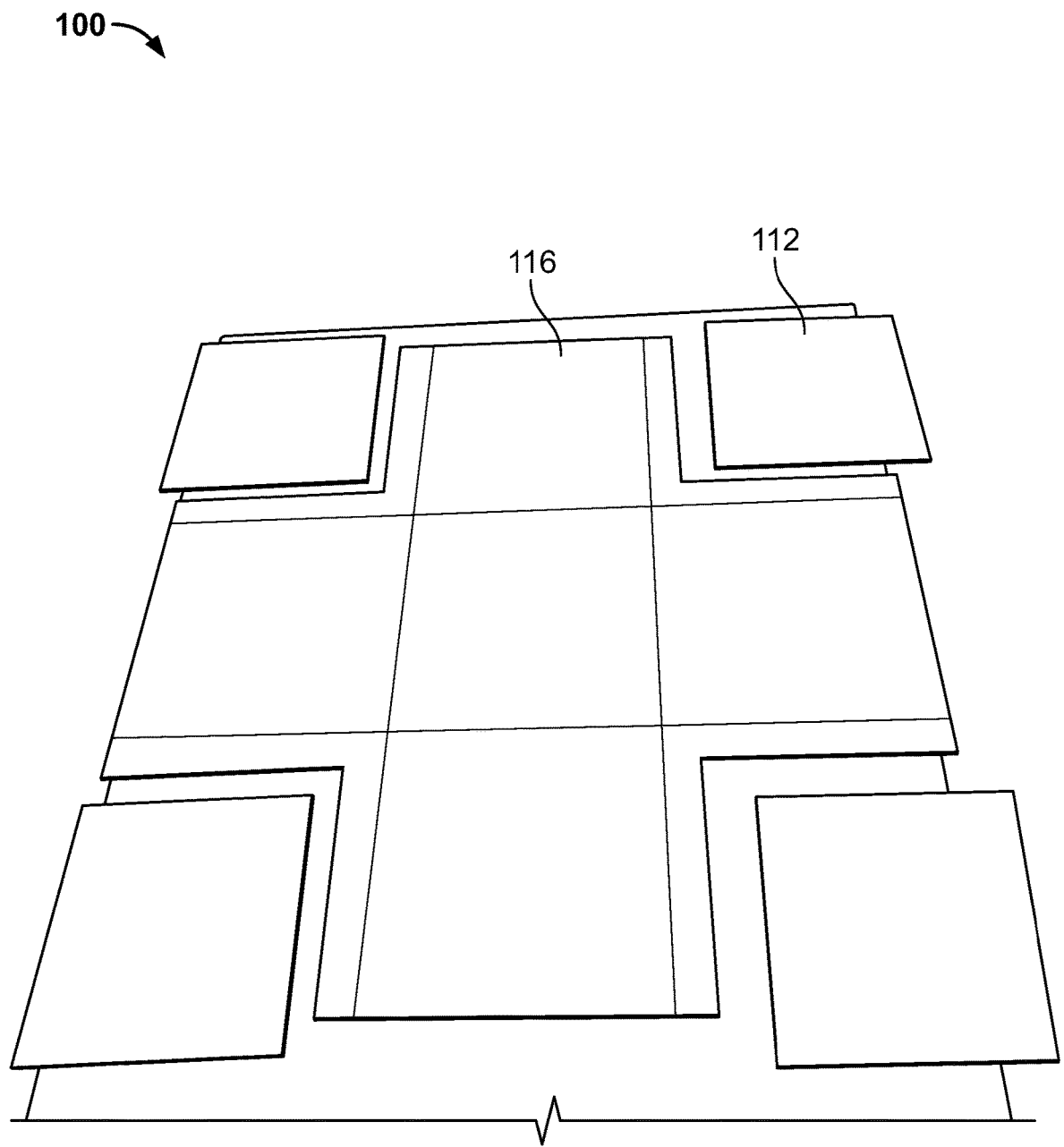
FIG. 2 shows the PVC sheet after cutting along chalk lines shown in FIG. 1 and removing the rectangular cut corner pieces from the PVC sheet.

FIG. 2 shows the PVC sheet 100 after cutting along chalk lines 104 shown in FIG. 1 and removing the rectangular cut corner pieces 112 from the PVC sheet. As shown in FIG. 2, the remainder of the PVC sheet 116 without the cut corner pieces 112 is generally cross shaped, T-shaped, shaped as a mathematical plus sign, etc.

Figure 3:
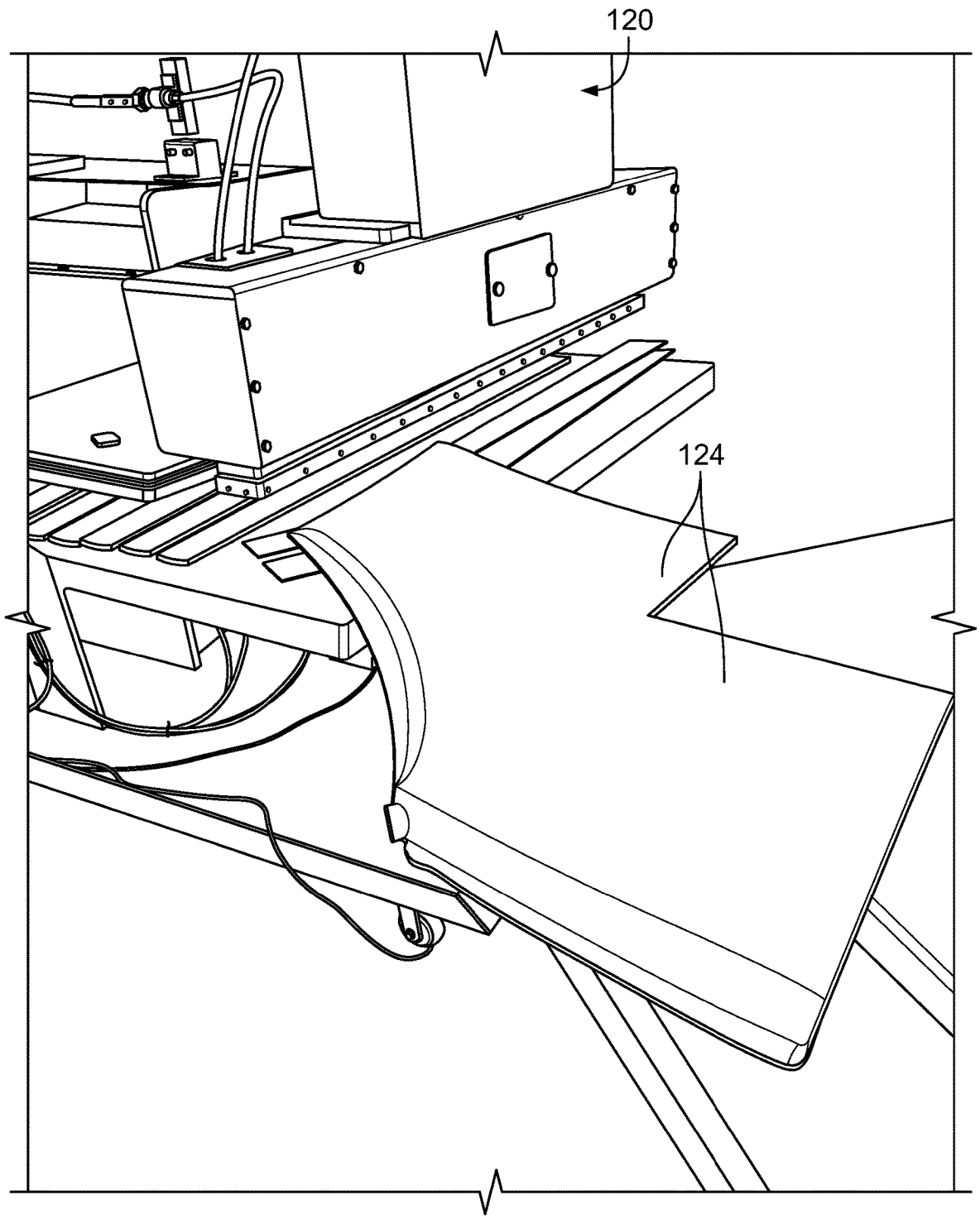
FIGS. 3 and 4 shows an exemplary RF compression welding machine being used to RF compression weld pairs of folded adjacent sidewalls together to thereby form a liner having RF compression welds along the corners defined between the pairs of adjacent sidewalls.
Figure 4:
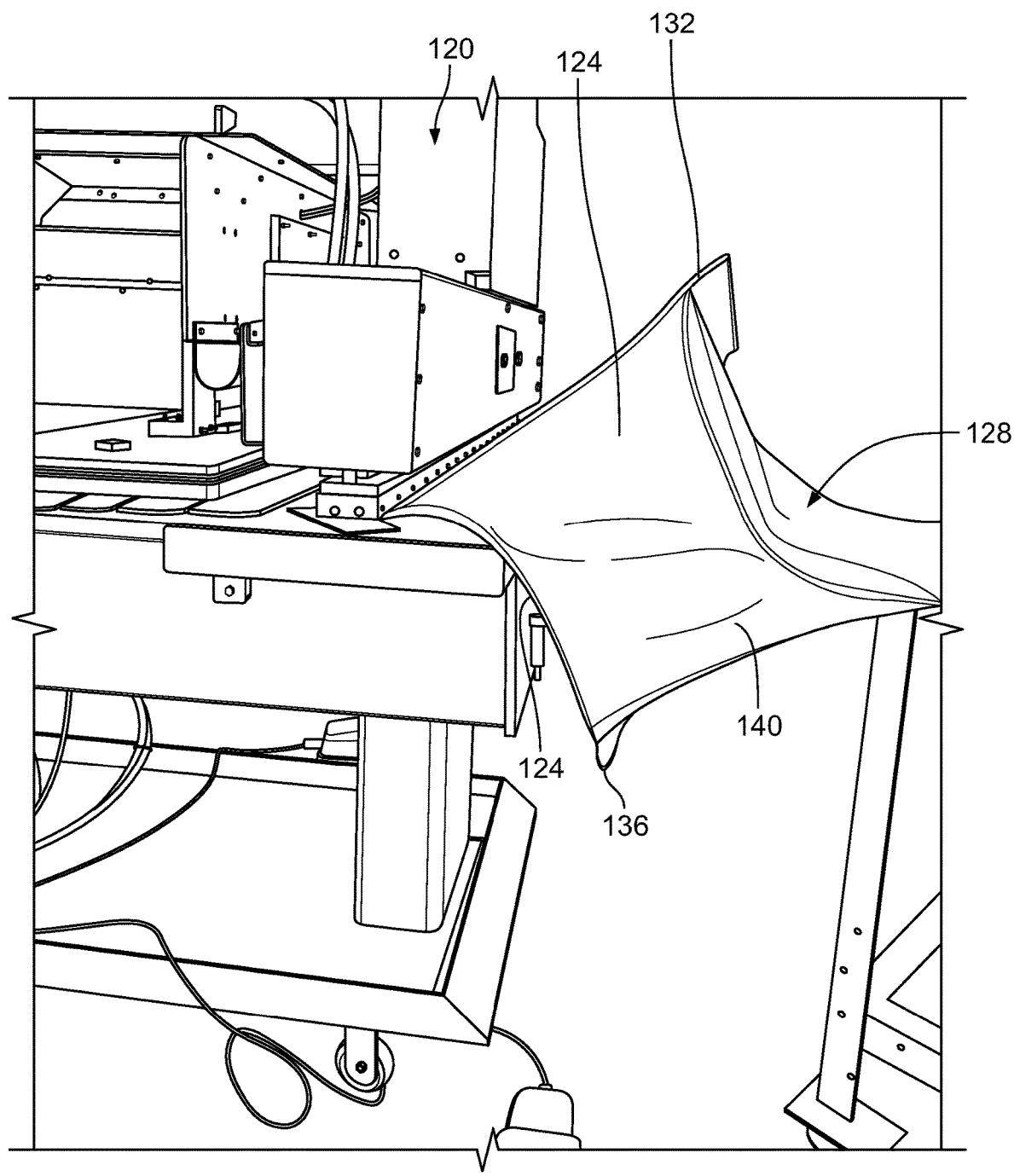

FIGS. 3 and 4 shows an exemplary RF compression welding machine 120 being used to RF compression weld the pairs of folded adjacent sidewalls 124 together to thereby form the liner 128 having RF compression welds 132 along the corners 136 defined between pairs of the adjacent sidewalls 124.

Figure 5:
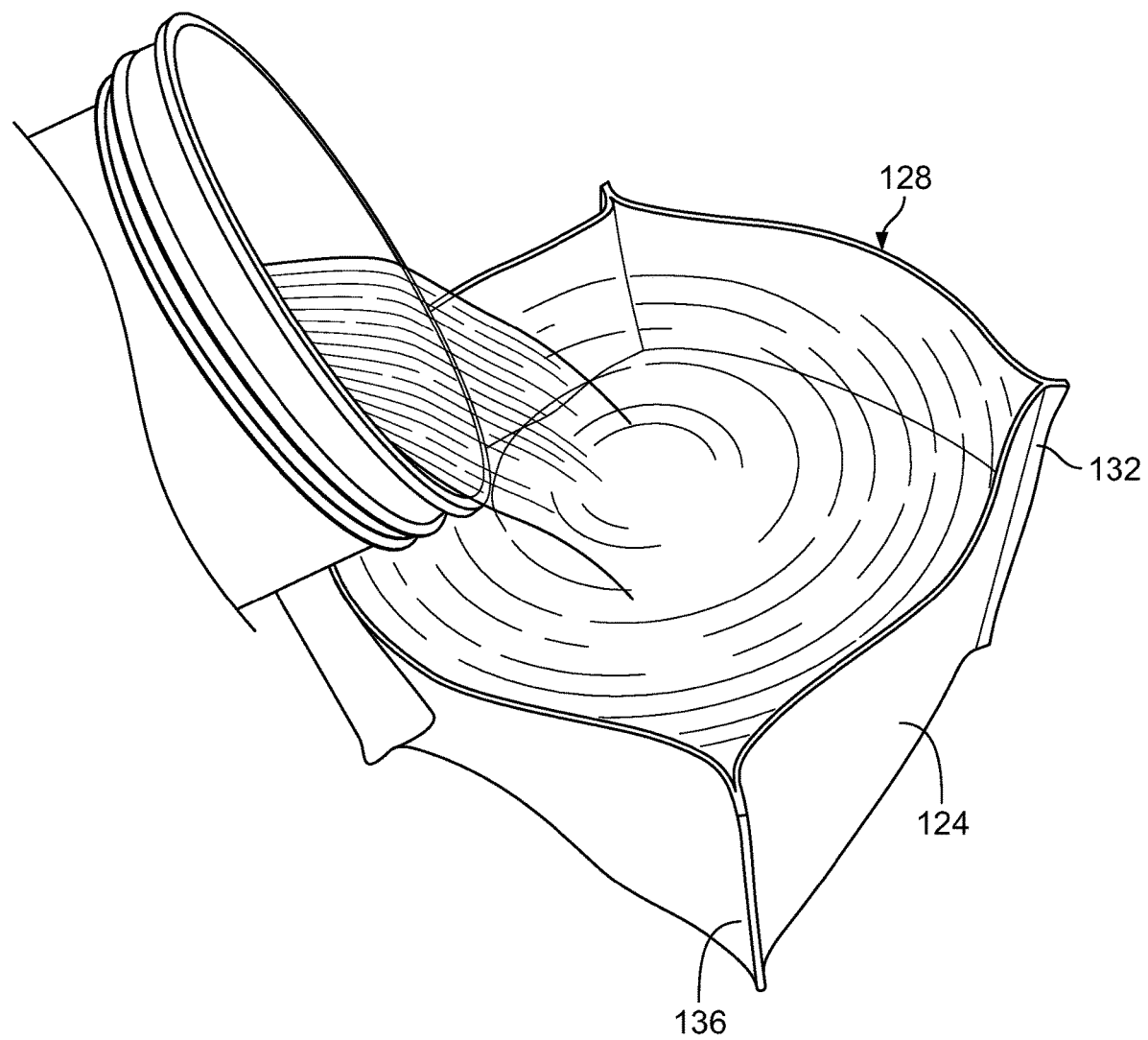
FIG. 5 shows water being added to the interior volume of the liner shown in FIG. 4.

FIG. 5 shows water being added to the interior volume of the liner 128 shown in FIG. 4. As shown in FIG. 5, the RF compression welds 132 provide water tight seals (as shown by the absence of any leaking water in FIG. 5) along the corners 136 between the pairs of adjacent sidewalls 124 of the liner 128.

Figure 6:
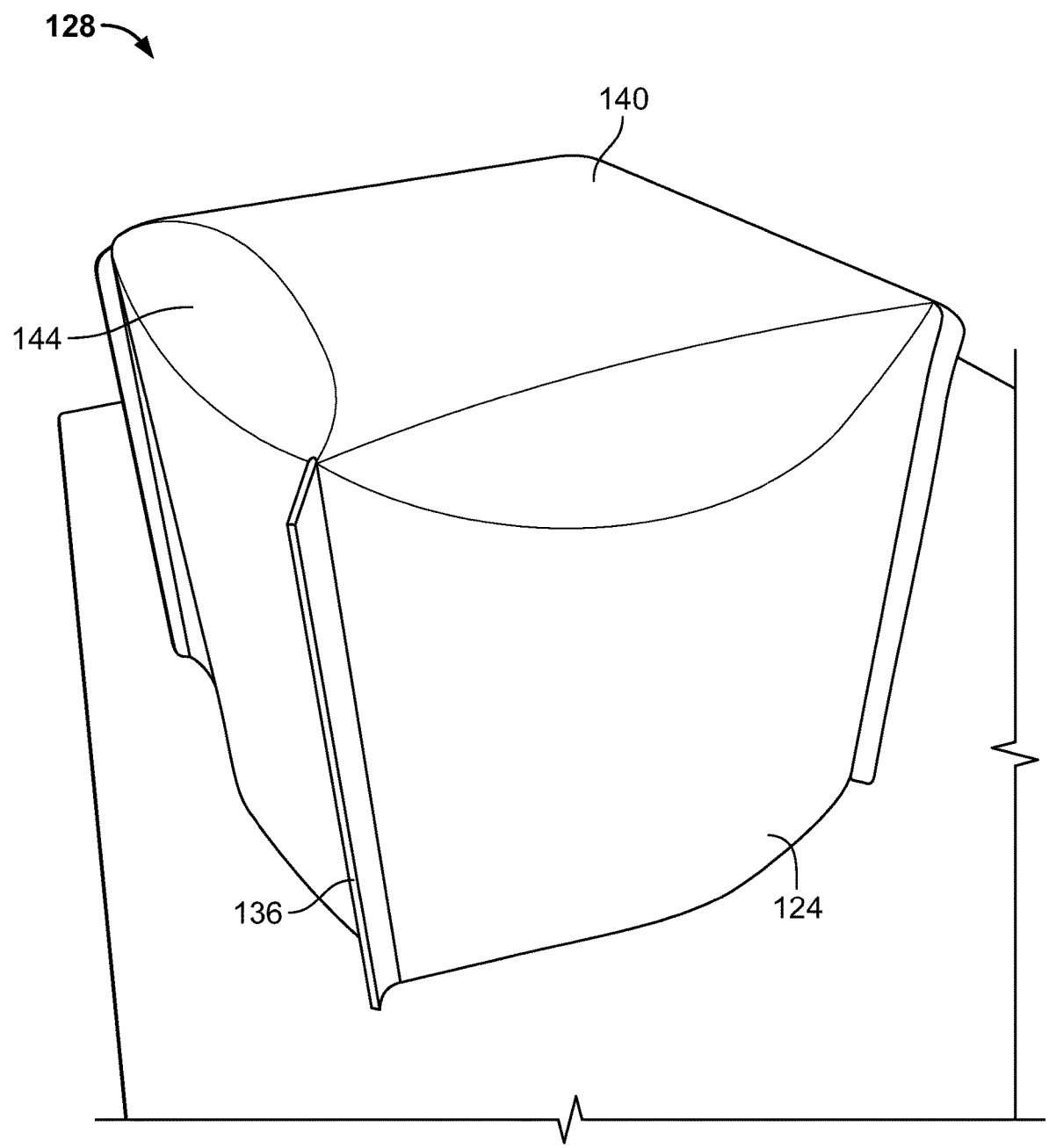
FIG. 6 shows the bottom and sidewalls of the liner shown in FIG. 5.

FIG. 6 shows the bottom 140 and sidewalls 124 of the liner 128 shown in FIG. 5. As shown in FIG. 6, the liner 128 does not include or require welds along the fold lines 144 between the bottom 140 and each corresponding sidewall 124 in this exemplary embodiment. Accordingly, the total number of required welds for the liner 128 may thus be reduced by using a single sheet 100 (FIG. 1) instead of a plurality of sheets that are RF welded or extrusion welded to each other. And, the reliability of the liner 128 may increase due to the reduction in the total number of welds. In contrast, a conventional liner may include inner bottom corners where three intersecting sheets are traditionally joined. Conventionally, the inner bottom corners tend to be problem areas and frequent sources of early leaks and premature failures as it tends to be difficult to perform a high-quality weld in a corner. This is because high-quality welds need the right speed, temperature, and pressure as the welding machine is moved along the joint. But at an inner bottom corner where three sheets are being welded, the sheets cannot be preheated because the welding machine stops. Accordingly, the reliability of the liner 128 shown in FIG. 6 may thus be increased due to the elimination of having to weld three sheets together at the inner bottom corners.

The liner 128 shown in FIGS. 5 and 6 may be configured for use in relatively low temperatures (e.g., less than 32 degrees Fahrenheit, etc.). Generally, the liner 128 and its RF compression welds 132 between pairs of adjacent sidewalls 124 have the ability to withstand relatively low temperatures.

FIG. 7 shows a liner 228 according to another exemplary embodiment in which the liner 228 is made from two sheets or panels of polyvinylidene fluoride (PVDF) (e.g., 2800 grade Kynar® PVDF that is translucent and 60 mils thick, other Kynar® PVDF, etc.). The two PVDF sheets attached to each other by RF overlap welds along overlapped edges of the PVDF sheets. Then, the RF overlap welded PVDF sheets are cut, folded, and RF compression welded along the corners 236 formed or defined between the pairs of adjacent sidewalls 224 to thereby create the PVDF liner 228. For example, the RF overlap welded PVDF sheets are cut into a shape having a rectangular bottom portion and four rectangular sidewall portions extending outwardly from the rectangular bottom portion. The rectangular bottom portion and four rectangular sidewall portions may cooperatively define a configuration (e.g., FIG. 2, etc.) that is generally T-shaped, cross shaped, shaped as a mathematical plus sign shape, etc. The four rectangular sidewall portions may be folded relative to the rectangular bottom portion to define pairs of adjacent sidewalls 224. Each pair of adjacent sidewalls 224 is RF compression welded to thereby create the PVDF liner 228. As shown in FIG. 7, the PVDF liner 228 is RF compression welded along the corners 236 formed or defined between each pair of adjacent sidewalls 224. The sidewalls 224 become adjacent after being folded relative to (e.g., upwardly, perpendicularly, etc.) the rectangular bottom portion of the PVDF liner 228.

FIG. 8 generally shows good weld strength that may be achievable by an RF compression weld 332 including an optional corner strip weld along the RF compression weld 332 to eliminate peeling concerns associated with the RF compression weld in some exemplary embodiments. For example, the RF compression weld 332 may be configured to be relatively strong and break only after a relatively high tensile or stretching force is applied and causes a relatively large amount of stretch.

In exemplary embodiments, thymol material or other synthetic material may be used for improved weld strength. For example, thymol material may be applied (e.g., wiped, smeared, etc.) along the sheet(s) of material before RF welding the sheet. The application of Thymol material before RF welding may advantageously increase the RF weld strength.

FIG. 9 shows a liner 428 according to another exemplary embodiment in which the liner 428 is made from two sheets or panels (broadly, pieces) of polyvinylidene fluoride (PVDF) having a polyester fabric backing (e.g., 2750 grade Kynar® flex copolymer PVDF that is 90 mils thick, other Kynar® flex copolymer PVDF, etc.). The two PVDF sheets are attached to each other by RF welds along overlapped edges of the PVDF sheets. Then, the RF welded PVDF sheets are cut into a shape having a rectangular bottom portion and four rectangular sidewall portions extending outwardly from the rectangular bottom portion. The rectangular bottom portion and four rectangular sidewall portions may cooperatively define a configuration (e.g., FIG. 2, etc.) that is generally T-shaped, cross shaped, shaped as a mathematical plus sign shape, etc. The four rectangular sidewall portions 424 may be folded relative to the rectangular bottom portion to define pairs of adjacent sidewalls 424. Each pair of adjacent sidewalls 424 is RF compression welded to thereby create the PVDF liner 428. As shown in FIG. 9, the PVDF liner 428 is RF compression welded along the corners 436 formed or defined between each pair of adjacent sidewalls 424. The sidewalls 424 become adjacent after being folded relative to (e.g., upwardly, perpendicularly, etc.) the rectangular bottom portion of the PVDF liner 428. The polyester fabric backing may help to increase durability of the liner 428. A removable clear plastic backing may be disposed over the polyester fabric backing for protection, e.g., to help keep the polyester fabric backing clean and/or free of dust, etc. An RF overlap weld(s) may extend vertically along a sidewall 424 of the liner 428.

By way of example only, the liner 428 may be configured to withstand being filled with water that is at least twenty-four inches deep and/or that is at a temperature of at least 180 degrees Fahrenheit while the liner 428 is unsupported and/or free standing. The weight of the water may cause the sidewalls 424 of the liner 428 to bulge outwardly such that the liner 428 becomes more rounded. But the liner 428 is preferably configured such that there is not any water leakage through the RF compression welds 432 along the corners 436 between pairs of adjacent sidewalls 424 of the liner 428

FIG. 10 shows an optional hand-welded corner or cap strip weld being applied over and/or along a portion of an RF compression weld 532, which, in turn, is along a corner 536 defined between a pair of adjacent sidewalls 524 of a liner 528. The liner 528 may be made from polyvinyl chloride (e.g., Koroseal® PVC, etc.) or other material (e.g., PVDF, etc.). The optional corner cap strip weld 548 shown in FIG. 10 may help prevent or inhibit peeling of the RF compression welds 532 along the corners 536 of the liner 528 according to some exemplary embodiments, such as exemplary embodiments including relatively large liners and/or at relatively high temperatures. But the optional corner cap strip weld 548 shown in FIG. 10 is not required, included, or necessary for all exemplary embodiments disclosed herein. In some exemplary embodiments disclosed herein, the liner may have sufficiently strong RF compression welds such that corner cap strip welds are not needed or provided over the RF compression welds along the corners of the liner. For example, an exemplary embodiment of a Kynar® flex PVDF liner has sufficiently strong RF compression welds along the corners between pairs of adjacent sidewalls such that corner cap/strip welds are not necessarily needed and thus not provided along the RF compression welds to prevent peeling.

FIGS. 11, 12, and 13 show an exemplary process of attaching panels or sheets 552, 556 (broadly, pieces) of material (e.g., PVC, PVDF, etc.) to each other by RF overlap welding along overlapped edges of the sheets 552, 556. As shown in FIG. 11, edges of the panels 552, 556 may be overlapped by a predetermined distance (e.g., about ½ inch, etc.). A RF welding bar (e.g., 2-inch wide bar, etc.) may then be pressed against the overlapped edges of the sheets 552 556 to thereby RF weld the sheets together.

FIG. 14 shows a conventional RF overlap weld 659 (on the right) and an exemplary embodiment of an RF overlap weld 660 (on the left). The RF overlap weld 660 (on the left) may be used to join overlapped edges of panels or sheets together in exemplary embodiments to make a larger unified panel or sheet. Notably, FIG. 14 shows that after undergoing similar tensile pulls, the RF overlap weld 660 (on the left) has not failed whereas the conventional RF overlap 659 (on the right) weld has broken apart and failed.

In exemplary embodiments, a liner may be made from one or more sheets or panels and/or welding material comprising an extruded plasticized polyvinyl chloride (PVC) sheet membrane. One such material is sold under the brand name Koroseal® PVC or High Performance Koroseal® PVC. In some exemplary embodiments, the liner is preferably made from High Performance Koroseal® PVC, which tends to be stiffer and more suitable for relatively high temperature RF welding processes as compared to Koroseal® PVC. In other exemplary embodiments, the liner is made from Koroseal® PVC. In yet other embodiments, a liner may comprise various other materials, such as vinyl or specially formulated flexible PVC, polyvinylidene fluoride (PVDF), a geomembrane, ethylene interpolymer alloy (EIA), one or more materials disclosed in U.S. Published Patent Application US2017/0369236 and/or U.S. Published Patent Application 2017/0369238, etc.

Exemplary embodiments of liners and linings disclosed herein may be used with virtually any type of (e.g., for different uses, formed from different materials (e.g., steel, fiberglass, rubber, lead, plastic, etc.), different shapes and sizes, etc.) process tank, indoor or outdoor containment pit, other storage or containment vessels (e.g., grain storage, etc.), etc. A liner may be configured for use as a bag liner (e.g., drop-in bag liner, a flexible or foldable drop-in bag liner, etc.), a membrane liner (e.g., a flexible heavy gauge membrane liner, etc.), other liner, a standalone tank, etc. For descriptive purposes only, the terms "liner" and "lining" may be used interchangeably herein. Also for descriptive purposes only, the term "liner" may also be used herein to refer to a free standing liner (e.g., drop-in liner, etc.) for a tank which liner will not be or is not bonded to a tank's surfaces. Additionally, the term "lining" may also be used herein to refer to a lining for a tank that will be or is bonded to a tank's surfaces.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms (e.g., different materials may be used, etc.) and that neither should be construed to limit the scope of the disclosure. In some example embodiments, well-known processes, well-known device structures, and well-known technologies are not described in detail.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges.

The terminology used herein is for the purpose of describing particular example embodiments only and is not intended to be limiting. For example, when permissive phrases, such as "may comprise", "may include", and the like, are used herein, at least one liner comprises or includes the feature(s) in at least one exemplary embodiment. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of making a liner from a rectangular sheet of material, the method comprising:
removing four rectangular corner pieces from the rectangular sheet of material such that a remainder of the rectangular sheet of material includes a rectangular bottom portion and four rectangular sidewall portions each extending outwardly relative to a corresponding one of the four sides of the rectangular bottom portion, whereby the rectangular bottom portion and four rectangular sidewall portions cooperatively define a generally cross shaped configuration;
repositioning the four rectangular sidewall portions relative to the rectangular bottom portion; and
radio frequency (RF) compression welding along corners formed or defined between each pair of adjacent rectangular sidewall portions to thereby create a liner defined by the rectangular bottom portion and the four rectangular sidewall portions that cooperatively define an internal volume usable for storage of materials;
wherein the rectangular sheet of material comprises one or more rectangular sheets of polyvinylidene fluoride (PVDF), ethylene interpolymer alloy (EIA), and/or a geomembrane; and/or
wherein repositioning the four rectangular sidewall portions relative to the rectangular bottom portion comprises repositioning the four rectangular sidewall portions to form or define the corners between each pair of adjacent rectangular sidewall portions without overlapping edges of the rectangular sidewall portions internally along the corresponding rectangular sidewall portions of the pairs of adjacent rectangular sidewall portions before RF compression welding along the corners.

2. The method of claim 1, wherein repositioning the four rectangular sidewall portions relative to the rectangular bottom portion comprises folding the four rectangular sidewall portions generally perpendicular and/or upwardly relative to the rectangular bottom portion to thereby form or define the corners between each pair of adjacent rectangular sidewall portions without folding edges of the rectangular sidewall portions internally along the corresponding rectangular sidewall portions of the pairs of adjacent rectangular sidewall portions before RF compression welding along the corners.

3. The method of claim 2, wherein the method includes RF compression welding along the corners formed or defined between each pair of adjacent folded sidewall portions to thereby provide water tight seals along the corners and without any welding along fold lines defined between the rectangular bottom portion and the four rectangular sidewall portions.

4. The method of claim 1, wherein the method includes reconfiguring the four rectangular sidewall portions from a first configuration in which the four rectangular sidewall portions are generally co-planar with the rectangular bottom portion to a second configuration in which the four rectangular sidewall portions are generally perpendicular with the rectangular bottom portion.

5. The method of claim 1, wherein the method includes making the liner from a single rectangular sheet of material such that the liner has a single piece construction defined by the four rectangular sidewall portions and the rectangular bottom portion.

6. The method of claim 1, wherein the method includes:
attaching two or more rectangular sheets of material together to thereby provide or define the rectangular sheet of material; and
then removing the four rectangular corner pieces from the rectangular sheet of material provided or defined by the attached two or more rectangular sheets of material.

7. The method of claim 6, wherein:
the two or more rectangular sheets of material comprise two or more rectangular sheets of polyvinylidene fluoride (PVDF) having a polyester fabric backing; and
attaching two or more rectangular sheets of material together comprises:
overlapping edges of adjacent rectangular sheets of material, and RF overlap welding the overlapped edges together; or
extrusion welding by infusing molten thermoplastic material within interfaces of adjacent rectangular sheets of material.

8. The method of claim 1, further comprising welding a corner strip weld over and/or along a portion of at least one of the RF compression welds along the corners formed or defined between each pair of adjacent sidewall portions.

9. The method of claim 1, wherein the rectangular sheet of material comprises one or more rectangular sheets of polyvinylidene fluoride (PVDF).

10. The method of claim 1, further comprising installing the liner within a process tank.

11. The method of claim 1, wherein the rectangular sheet of material comprises one or more rectangular sheets of ethylene interpolymer alloy (EIA).

12. The method of claim 1, wherein the rectangular sheet of material comprises one or more rectangular sheets of a geomembrane.

13. A method of making a liner from a sheet of material, the method comprising:
removing one or more corner pieces from the sheet of material such that a remainder of the sheet of material includes a bottom portion and sidewall portions extending outwardly relative to the bottom portion;
repositioning the sidewall portions relative to the bottom portion; and
radio frequency (RF) compression welding along one or more corners formed or defined between each pair of adjacent sidewall portions to thereby create a liner defined by the bottom portion and the sidewall portions that cooperatively define an internal volume usable for storage of materials;
wherein the sheet of material comprises one or more sheets of polyvinylidene fluoride (PVDF), ethylene interpolymer alloy (EIA), and/or a geomembrane; and/or
wherein repositioning the sidewall portions relative to the bottom portion comprises repositioning the sidewall portions to form or define the one or more corners between each pair of adjacent sidewall portions without overlapping edges of the sidewall portions internally along the corresponding sidewall portions of the pairs of adjacent sidewall portions before RF compression welding along the one or more or more corners.

14. The method of claim 13, wherein:
repositioning the sidewall portions relative to the bottom portion comprises folding the sidewall portions generally perpendicular and/or upwardly relative to the bottom portion to thereby form or define the one or more corners between each pair of adjacent sidewall portions without folding edges of the sidewall portions internally along the corresponding sidewall portions of the pairs of adjacent sidewall portions before RF compression welding along the one or more or more corners; and the method includes RF compression welding along the corners formed or defined between each pair of adjacent folded sidewall portions to thereby provide water tight seals along the corners and without any welding along fold lines defined between the bottom portion and the sidewall portions.

15. The method of claim 13, wherein the method includes reconfiguring the sidewall portions from a first configuration in which the sidewall portions are generally co-planar with the bottom portion to a second configuration in which the sidewall portions are generally perpendicular with the bottom portion.

16. The method of claim 13, wherein the method includes making the liner from a single sheet of material such that the liner has a single piece construction defined by the sidewall portions and the bottom portion.

17. The method of claim 13, wherein the method includes:
attaching two or more sheets of material together to thereby provide or define the sheet of material; and
then removing each of the corner pieces from the sheet of material provided or defined by the attached two or more sheets of material.

18. The method of claim 17, wherein:
the two or more sheets of material comprise two or more sheets of polyvinylidene fluoride (PVDF) having a polyester fabric backing; and
attaching two or more sheets of material together comprises:
overlapping edges of adjacent sheets of material, and RF overlap welding the overlapped edges together; or
extrusion welding by infusing molten thermoplastic material within interfaces of adjacent sheets of material.

19. The method of claim 13, further comprising welding a corner strip weld over and/or along a portion of at least one of the RF compression welds along the corners formed or defined between each pair of adjacent sidewall portions.

20. The method of claim 13, wherein the sheet of material comprises one or more sheets of polyvinylidene fluoride (PVDF).

21. The method of claim 13, further comprising installing the liner within a process tank.

* * * * *